INVENTOR
Alda V. Bedford
BY
[signature]
ATTORNEY

April 13, 1954 A. V. BEDFORD 2,675,422

ELECTRICAL SCANNING

Filed April 1, 1950 2 Sheets-Sheet 2

INVENTOR
Alda V. Bedford
BY
Olin L. Mitchell
ATTORNEY

Patented Apr. 13, 1954 2,675,422

UNITED STATES PATENT OFFICE 2,675,422

ELECTRICAL SCANNING

Alda V. Bedford, Princeton, N. J., assignor to Radio Corporation of America, Princeton, N. J., a corporation of Delaware Application April 1, 1950, Serial No. 153,473

19 Claims. (Cl. 178—5.4)

The present invention relates to electrical scanning methods and systems and more particularly, although not necessarily exclusively, to scanning systems and methods used in the color television representation of images or scenes.

More directly, the present invention is involved with improved methods, techniques and apparatus for generating color television signals of the type used to delineate a number of primary color images which, when superimposed, produce a television image having full color.

Various ways are presently known to produce color television images. In practically all of the more popular systems, the scene to be televised in color is effectively scanned by a number of television cameras all at the same time. Each camera is fixed to pick up only one particular color aspect of the picture. The colors assigned to each of the cameras scanning the scene are chosen so that they are additively complementary. That is to say, when all the colors represented by the cameras are added together, they will produce white light.

Present trends point to the use of only three television cameras or, more generally speaking, three complementary color records of a given scene. The color represented by each of the complementary color records is referred to as a primary color and as above noted, these three primary colors must add together to produce white light. It is noted that other systems using only two primary colors are possible, while color fidelity is improved if more than three color records are used. Nevertheless, most present-day color television transmission systems are based upon only three primary colors, usually red, green and blue.

If three separate cameras are used to scan the same scene and each camera represents a separate primary color aspect of the scene, extreme care must be used in registering the cameras. If the scanning actions of all three cameras are not exactly timed with one another, it is apparent that the three color images reproduced at the receiver by aid of the cameras will not exactly register when superimposed. The bad effects of improper registration will be most noticeable in connection with the picture detail of the reproduced color television image. This makes the picture look blurred even though each of the individual primary color images produced by the cameras may be very clear.

When using separate television cameras to produce separate color records of a scene, another problem arises. This problem is the light loss contributed by the color filters placed in front of each of the cameras. For instance, if ordinary panchromatic or black and white type television cameras are used in a color television system, it has, in the past, been the practice to put a different color filter in front of each camera. The red camera would have a red filter. The blue camera would have a blue filter and, of course, the green camera would be provided with a green filter. Since most television cameras generate within themselves a certain spurious signal output regardless of whether they see light or not, the use of the filter tends to decrease the signal-to-noise ratio of the system. For instance, the blue filter in front of its camera will reduce the total amount of light hitting the blue camera. Since the camera has a certain amount of spurious noise which it generates even under conditions of no light, the light reduction imposed by the filter will cause a reduction of the signal-to-noise ratio at the camera output.

The method of color scansion embraced by one form of the present invention consists of the following steps. We shall consider a three primary color system. The scene is scanned by two cameras fixed to represent different primary color aspects of the scene being scanned. A third primary color representation is produced by scanning the scene with an ordinary black and white or panchromatic camera having no one particular color sensitivity. All colors are represented equally by this camera. The signal produced by this camera is then a typical black and white type television signal. This black and white or panchromatic signal is then subtractively combined with the sum of the signals produced by the two other cameras. The resulting signal will then represent the difference between the sum of the colors represented by the two single-color cameras and white light. By definition then, the resultant signal must be a primary color signal. For example, if the two single-color cameras represented red and green aspects of the picture, the resultant signal produced by the present invention would represent the blue aspects of the scene.

The overall signal-to-noise ratio of the resulting color television signals will be improved because the panchromatic camera has no light reducing filter in front of it.

The present invention, then, takes further advantage of the fact that picture detail in a reproduced television image is produced by high frequency signal components. Thus, in order to prevent the effects of misregistration of these high frequency components as produced by the separate color cameras, the present invention, by means of filters, reduces the high frequency output of the two single color cameras. The frequency components of the black and white camera are, however, not altered. The high frequency components produced by the black and white camera may be further added to the output of the other two single color cameras to replace that detail which was cut off by the filters. Consequently, no matter how the resulting signals are used to produce a color television image, the high frequency components in each color aspect image must register since the detail in each color record is produced by the single panchromatic camera.

A more complete understanding of the present invention, as well as other objects and features of advantage, will appear from the following description when taken in connection with the accompanying drawings.

In the drawing, Figure 1 is a block diagram representation of a color television scanning system utilizing the present invention.

Figure 1:
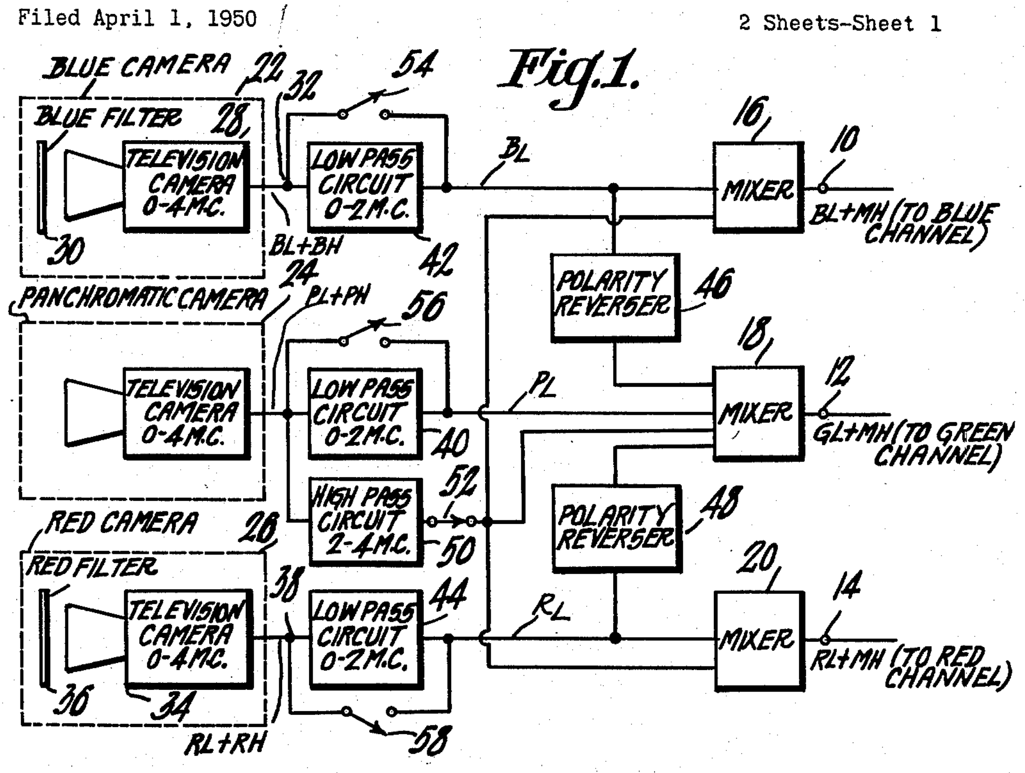

Turning now to Figure 1, there is shown at 10, 12 and 14 three separate color channel terminals for a color television system. Channel 10 is designated to feed the blue channel of the system. Channels 12 and 14, however, correspond to the green and red channels of the system. The colors blue, green and red, of course, are additive primary colors whose sum will produce white light. Channels 10, 12 and 14 are respectively fed by mixer circuits 16, 18 and 20. To get the proper color signals to appear at the output of the mixer circuits, three television cameras 22, 24 and 26 are used.

Camera 22 may be referred to as a blue camera. It may comprise a television camera which is sensitive to substantially no color except blue. On the other hand, it may comprise an ordinary black and white television camera 28 having a blue filter 30 in front of it. In any event, the signal appearing at the output terminal 32 of the camera 22 will represent intensity variations corresponding to the blue color component of the scene scanned by the camera. For later convenience, the blue signal has been designated as $B_L+B_H$. $B_L$ represents the low frequency components of the blue signal while $B_H$ represents the high frequency components of the blue signal. The red camera 26 is arranged in a similar manner to the blue camera 22. It has, for example, been shown as a regular black and white camera 34 arranged to look through a red filter 36. The output of the red camera appearing at terminal 38 will then comprise the red signal $R_L+R_H$. Again these two components represent respectively the low and high frequency portions of the red signal. The outputs of the blue and the red cameras are, of course, channeled to the inputs of the mixers 16 and 20 which feed the terminals 10 and 14 of the color channels.

Prior art practice would now lead one to employ a third color camera constructed somewhat similar to the cameras 22 and 26. This camera, however, would be made sensitive to the third primary color being used, namely green. The output of the green camera would then be used to feed the mixer 18 and hence the channel 12.

However, according to the present invention the camera 24 is nothing more than a black and white television camera. It preferably has light response which is panchromatic in nature. That is, it responds substantially equally to all of the various colors in the scene at which it looks. The output of the panchromatic camera 24 is then applied by a low pass filter 40 to the input of the mixer 18. Low pass filters 42 and 44 are also placed between the blue and red cameras and the respective mixers 16 and 20. The characteristics of the filters 40, 42 and 44 are substantially the same, and, for example, are indicated as passing only those video signals falling between zero and two megacycles. The outputs of the low pass filters 42 and 44 are applied to the input of the mixer 18 via the polarity reversal circuits 46 and 48. This means that into the mixer 18 which is of the algebraic adding variety, there will be applied three signals. The first signal will be the low frequency components of the blues and the second signal will be the low frequency components of the reds. These two low frequency components will be of the same polarity. However, the panchromatic camera 24, sensitive to all colors, will also produce like blue and red low frequency components. These will be fed into the mixer without going through a polarity reverser. Hence, if the amplitudes of the various signals are adjusted properly, the blue low frequencies and the red low frequencies from the polarity reversers 46 and 48 will cancel the effective blue and red low frequencies in the panchromatic signal. This will leave to appear at the output of mixer 18 only what is left of the panchromatic camera signal. By definition of what constitutes additive primary colors, the output of the mixer 18 must represent intensity variations in the scene of the green components thereof. In other words, the output of the mixer 18 represents the difference between the sum of two out of three color components and a white signal representing all three color components.

It will be appreciated that the arrangement of the polarity reversers 46 and 48 and mixer 18 may be altered in any way to produce the same function. They may be replaced by any means for subtractively combining the panchromatic camera signal with the other two color signals to produce a resultant signal.

So far, the output of the mixer 18 represents only the low frequency components of a green color television signal. Outputs of mixers 16 and 20 would also represent only low frequency components of the blue and red camera outputs. Thus, a reproduced television image based upon these signals alone would lack picture detail.

According to the present invention, the high frequency components $P_H$ of the panchromatic signal produced by the camera 24 are separated by means of the high pass filter 50. The high pass filter 50 allows effective passage of signals from 2 to 4 megacycles or higher. In some cases those signals above 4 megacycles are cut off later by the transmitter so that even though the filters pass frequencies above 4 megacycles the result is the same as though band pass filters were used. Four megacycles is an arbitrary upper limit set for the convenience of describing the present system. The output of the high pass filter 50 is applied by a switch 52 to the inputs of the mixers 16, 18 and 20. Since the panchromatic camera 24 represents intensity variations of all the colors, the output of the high pass filter 50 will represent picture detail of all three color channels taken as a sum. Thus, the input to color channels 10, 12 and 14 will be supplied by low frequency components of single color records of the scene and high frequency components from a panchromatic scansion of the scene.

It is noted that the use of the panchromatic high frequency components on all three channels will produce acceptable color balance in the reproduced color television picture. This comes about by way of the fact that the human eye has limited ability to resolve fine detail when such detail resides in changes from one color to another of substantially the same brightness. This ability of the eye to resolve fine detail under such conditions is very much less than its ability to notice changes in brightness such as from black to white. This phenomenon is explained in greater detail in my U. S. Patent No. 2,554,693 filed December 7, 1946, and entitled "Simultaneous Multi-Color Television."

Should it be desired to take advantage of only the improved signal-to-noise ratio provided by the present invention and not realize the advantage of improved definition, the switch 52 may be opened and switches 54, 56 and 58 closed. This will bypass the low pass circuits 40, 42 and 44 so that the outputs of mixers 16 and 20 will contain both the low and high frequency components of their respective cameras. The use of mixers 16 and 20 and high pass circuit 50 under these conditions is not necessary since switch 52 is open.

A reduced band width transmission system of the type described in my above-mentioned U. S. Patent No. 2,554,693, is also possible with the present invention. With such an arrangement, low pass circuits 42 and 44 are left in effect as drawn in Figure 1. Low pass circuit 40 would be bypassed to let both the panchromatic lows and highs ($P_L+P_H$) reach the mixer 18. The high pass circuit 50 as well as mixers 16 and 20 need not then be provided. The total transmission band width of the system would then be 2 megacycles each for the blue and red cameras plus 4 megacycles for the green channel. This makes a total of 8 megacycles required for transmitting the composite color signal. As explained in my above-mentioned U. S. patent, this represents quite a saving over the 12 megacycles otherwise necessary for a simultaneous color transmission system.

Figure 2:
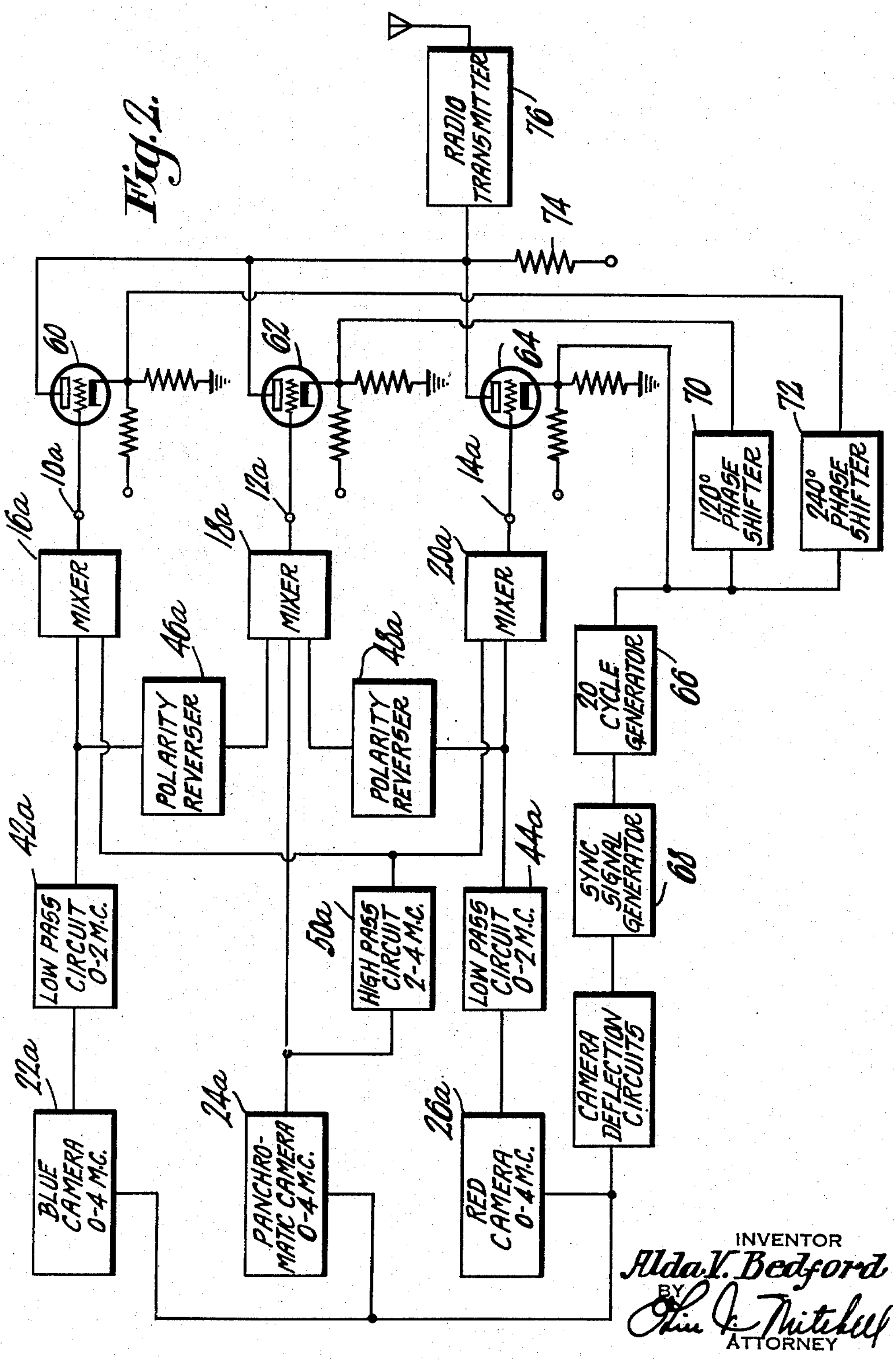
Figure 2 is a block representation of another form of color television scanning system embodying the novel features of the present invention.

The arrangement in Figure 2 embodies about the same principles as Figure 1. Figure 2, however, indicates the application of the system of Figure 1 to a field sequential type color television system. Three color cameras 22*a*, 24*a* and 26*a* produce the required blue signal, panchromatic signal and red signal. Low pass filters 42*a* and 44*a* have been put in series with the blue and red camera outputs. These low pass filter circuits, as previously described, feed the mixers 16*a* and 20*a* respectively. In Figure 2 some simplification over Figure 1 has been made. The low pass filter 40 connected with the output of the panchromatic camera 24 in Figure 1 has been omitted. Under such circumstances, the output of the high pass filter 50*a* in Figure 2 is applied only to the inputs of the mixers 16*a* and 20*a*. Polarity reversers 46*a* and 48*a* connecting the outputs of the low pass filter circuits 42*a* and 44*a* with the input of the mixer 18*a* are shown for the reasons indicated in connection with Figure 1. The signals appearing at the output terminals 10*a*, 12*a* and 14*a* of the mixers 16*a*, 18*a* and 20*a* are of the same character as described with respect to Figure 1.

As stated, Figure 2 illustrates a field sequential type color television system. Thus, the outputs of the mixers 16*a*, 18*a* and 20*a* may be fed to the inputs of gate tubes 60, 62 and 64. These gate tubes are normally biased to cutoff by means of the positive bias supplied to their cathodes. However, a 20 cycle per second generator 66 synchronized by the generator 68 is arranged to key the gate tubes on successively. This is accomplished through the well known use of the 120° phase shifter 70 and the 240° phase shifter 72. These phase shifters could be in the form of delay lines or networks. Gate tube 64 will first turn on. Then 64 will close and tube 62 will turn on. After tube 62 has closed, tube 60 will become conductive and the cycle will repeat itself. The interval between successive conduction of tubes could, of course, be $\frac{1}{60}$ of a second, as is required by the present-day television standards. Thus, across the output of resistor 74 there will appear during successive intervals of $\frac{1}{60}$ of a second first red channel information, then green channel information and finally blue channel information. This, of course, may be fed to a transmitter 76 for radio transmission. Camera deflection circuits 78 have been indicated in Figure 2 by way of example. Further information on the field sequential system of transmitting color television images may be obtained through reference to U. S. Patent No. 2,389,039 to A. N. Goldsmith entitled "Color Television System."

Figure 3:
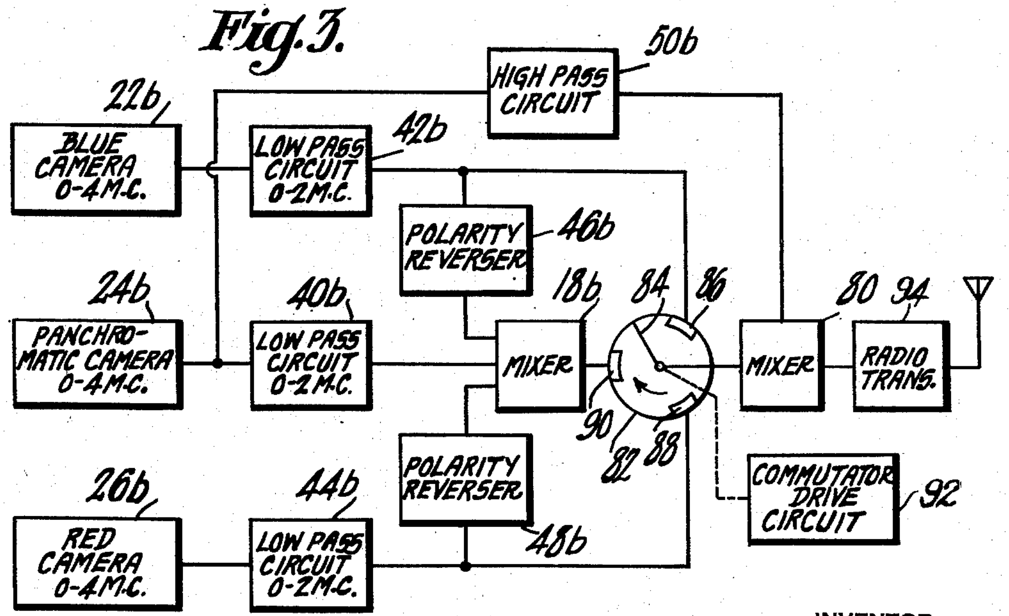
Figure 3 illustrates in block form still another color television scanning system embodying the novel features of the present invention.

The arrangement of Figure 3 shows the present invention applied to a dot sequential type color television system. A detailed understanding of such a color television system may be had through reference to the issue of the RCA Review for December 1949, pages 504–524 in an article entitled "A 6 megacycle compatible high definition color television system" by the RCA Laboratories Division, Princeton, New Jersey. Here again, a blue camera 22*b*, a panchromatic camera 24*b* and a red camera 26*b* are provided. The outputs of these cameras are connected to low pass filters 42*b*, 40*b* and 44*b* respectively as in Figure 1. The outputs of the low pass circuits 42*b* and 44*b* are connected through polarity reversers 46*b* and 48*b* to the input of the mixer 18*b*, also as in Figure 1. However, for the purposes of the dot sequential system of color transmission, no high frequency components from the panchromatic camera are inserted into the mixer 18*b* as was shown in Figures 1 and 2. Instead, the high frequency components of the panchromatic camera output are passed through the high pass circuit 50*b* to the input of another mixer 80. The mixer 80 combines the high frequency components passed by high pass circuit 50*b* with the output of a signal commutator circuit or sampler diagrammatically indicated at 82. The sampler 82 is illustrated in a very functional manner. It is shown to consist of a rotating armature 84 which rotates in the direction of the arrow to successively contact the terminals 86, 88 and 90 of the sampler. The output of the sampler is taken from the armature 84 and applied to the mixer 80. The speed at which the armature 84 thus samples the red low frequency components, the green low frequency components and the blue low frequency components is determined by some form of commutator drive circuit indicated at 92. Although indicated as being of a mechanical nature, the sampler 82 with its drive circuit 92 may take a variety of electronic forms. For example, the use of gate tubes as in Figure 2 may be employed. However, the sampling rate of the dot sequential system in Figure 3 is much higher than the field sequential system of Figure 2. This is described in full detail in the above-referenced article appearing in the RCA Review. However, by way of example, it may be borne in mind that the sampling rate of the system of Figure 3 is preferably in the neighborhood of several megacycles or so for each color. The output of the mixer 80 will then constitute a time multiplexed color television signal which may be applied directly to modulate the transmitter 94.

It is to be understood that although all of the above described embodiments of the present invention have embraced a panchromatic type camera taken in combination with two monocromatic type cameras, other color response characteristics may be used without departing from the spirit and scope of the present invention. For example, in Figure 1, the camera 22 may be given a red-green response so that its output at terminal 32 will comprise both red and green signal information. In order to get the green signal alone for application to terminal 12 of Figure 1, it will then be only necessary to subtract the output of the red camera 26 from the red-green output of the modified camera 22. Under such conditions the blue signal may be obtained by merely subtracting the output of modified camera 22 $(R+G)$ from the output of the panchromatic camera 24. Many combinations are possible but as will be seen from the above discussion the more colors to which each camera is responsive the greater will be the signal to noise ratio of the resulting composite television signal.

By way of a still further example, the panchromatic camera shown in the above embodiments may be replaced by a camera responsive only to two colors. The other two cameras may be given other suitable response characteristics, each again responsive to but two colors. Thus, in Figure 1 camera 22 may be given red-green response $(R+G)$, camera 24 a red-blue response $(R+B)$, while camera 26 may give blue-green $(B+G)$ response. Under such conditions the output of the red-green camera could be subtracted from the output of the red-blue camera to obtain signal $(B-G)$. This $(B-G)$ signal may then be added to the $(B+G)$ signal coming from the third camera to produce a pure blue signal. Part of this pure blue signal may then be subtracted from the red-blue camera to get a red signal. The red signal may in turn be subtracted from the red-green camera to get the green signal. Again the versatility and scope of the present invention can be seen to be quite large.

It is thus seen that the present invention finds application to a variety of color television systems. Its advantages can be realized in any system where color representation of an object is to be made by television scanning techniques.

Having thus described my invention, what I claim is:

1. In a color television system, a first television camera responsive to substantially none but one primary color aspect of a television scene to produce a color signal, a second television camera responsive to substantially all color aspects of the same television scene to produce a substantially panchromatic type television signal, means including an electrical signal subtracting circuit having a signal inverter and a plurality of signal inputs for subtractively combining electrical signals and delivering a resultant to an output terminal, connections applying the color signal outputs of said television cameras to respectively different inputs of said subtracting circuit the connection from the output of one of the television cameras to the respective signal input of the subtracting circuit being made through the signal inverter, whereby to obtain at the output of said subtracting circuit a color signal representing a color complement of at least that color represented by said first color camera.

2. In an electrical system for scanning a color scene to produce separate trains of electrical signals each representing a different complementary color aspect of the scene scanned, a first scanning means responsive to light of substantially all colors emanating from said scene to develop a panchromatic type signal train, a second scanning means responsive to substantially none but one color aspect of the color scene to develop a color signal train, a signal subtracting means having a plurality of input circuits and at least one output circuit, means for applying the said panchromatic signal train and said color signal train to the inputs of said subtracting means whereby the resultant signal train appearing in the output circuit of said subtractive means represents a color aspect of said scene which is complementary to the signal train developed by said second scanning means.

3. In an electrical system for scanning a color scene to produce separate trains of electrical signals each representing a different complementary color aspect of the scene scanned, a first scanning means responsive to light of substantially all colors emanating from said scene to develop a panchromatic type signal train, a second scanning means responsive to substantially none but one color aspect of the color scene to develop a color signal train, a third scanning means responsive to substantially none but one other color aspect of the color scene different from that color represented by said second scanning means to develop another color signal train, means for subtractively combining said panchromatic signal train with each of said color trains to produce resultant signal trains, means for combining in an additive manner said resultant signal trains into a single remainder signal train whereby said remainder signal train represents a color aspect of said scene which is complementary to the color aspects represented by said second and third scanning means.

4. An electrical scanning system for representing in color the explored areas of a scene by a plurality of concomitantly generated signal trains, each train representing a different complementary color record of the scene, a panchromatic scanning means for scanning said scene to develop a panchromatic signal train representing intensity variations of substantially all component colors in the scene, a plurality of other scanning means for scanning said scene, each of said other scanning means developing a color signal train substantially representing intensity variations of a different single component color in the scene, means for additively combining all of said color signal trains produced by said other scanning means to form a resultant signal, and means for subtractively combining said panchromatic signal train with said resultant signal whereby to produce a difference signal train which is representative of intensity variations of a color component in said scene different from but complementary to said color components developed by said plurality of other scanning means.

5. An electrical scanning system for representing in color the explored areas of a scene by a plurality of concomitantly generated signal trains each train representing a different complementary color record of the scene, a panchromatic scanning means for scanning said scene to develop a panchromatic signal train representing intensity variations of substantially all component colors in the scene, a plurality of other scanning means for scanning said scene, each of said other scanning means developing a color signal train substantially representing intensity variations of a different single component color in the scene, a mixing circuit connected with said scanning means for subtractively combining said panchromatic signal train with each of the color signal trains developed by said other scanning means to produce a resultant signal whereby said resultant signal represents intensity variations of a color component in said scene different from that represented by any of said plurality of other scanning means.

6. Apparatus according to claim 4 wherein there is additionally provided a low pass filter connected between the output of said panchromatic scanning means and said subtractive combining means, a separate low pass filter similar to said first mentioned low pass filter connected between the output of each of said other scanning means and the input of said subtractive combining means, a high pass filter adapted to cutoff at a frequency not substantially less than the highest frequency effectively passed by any of said low pass filters, connections coupling the input of said high pass filter to the output of said panchromatic scanning means, a signal mixing circuit in the output of at least one of the other scanning means and on the output side of its respective low-pass filter, and means for coupling the output of said high pass filter to the input of said signal mixing circuit.

7. Apparatus according to claim 6 wherein there is provided a plurality of additional separate signal mixing circuits each having one of their inputs connected with the output of a different one of said other scanning means and connections from the output of said high pass filter to another input on each of said additional mixing circuits whereby the outputs of each of said additional mixing circuits represent the sum of both low frequency signal components of signal trains corresponding to different single color components in the scene plus the high frequency components of the signal train developed by said panchromatic scanning means.

8. An electrical scanning system for representing in color the explored areas of a scene by a plurality of concomitantly generated signal trains each train representing a different complementary color record of the scene, a panchromatic scanning means for scanning said scene to develop a panchromatic signal train representing intensity variations of substantially all component colors in the scene, a plurality of other scanning means for scanning said scene, each of said other scanning means developing a color signal train substantially representing intensity variations of a different single component color in the scene, means for combining in the same polarity all of said color signal trains to form a resultant signal, and means for combining said resultant signal with said panchromatic signal train in opposite polarity relation whereby to produce a difference signal train which is representative of intensity variations of a color component in said scene different from but complementary to said color components represented by said plurality of other scanning means.

9. An electrical scanning system for representing in color the explored areas of a scene by a plurality of concomitantly generated signal trains each train representing a different complementary color record of the scene, comprising a panchromatic scanning means for scanning said scene to develop a panchromatic signal train representing intensity variations of substantially all component colors in the scene, a plurality of other scanning means for scanning said scene, each of said other scanning means developing a color signal train substantially representing intensity variations of a different single component color in the scene, a mixing circuit including signal polarity reversing circuits connected with the output of said scanning means for combining the signal trains developed by said other scanning means in opposite polarity relation with said panchromatic signal train to produce a resultant output signal having components representing intensity variations of a color component in said scene different from that represented by any of said plurality of other scanning means.

10. Apparatus according to claim 9 wherein there is additionally provided a separate low pass filter connected between the output of each of said other scanning means and the input of said mixing circuit whereby high frequency components of said mixing circuit resultant output signal represent panchromatic intensity variation information while low frequency components of said output signal represent single color intensity variation information.

11. Apparatus according to claim 10 wherein there is additionally provided a plurality of additional mixing circuits each having input circuits and output circuit connections from each of the outputs of a plurality of said low pass filters to an input circuit of a separate and respective one of said additional mixing circuits, a high pass filter adapted to cutoff at a frequency not substantially less than the highest frequency effectively passed by said low pass filters, a connection between the input of the high pass filter and the panchromatic scanning means and a connection from the output of said high pass filter to another input circuit on each of said additional mixing circuits whereby the outputs of said additional mixing circuits represent the sum of both low frequency signal components of signal trains corresponding to respectively different single color component in the scene plus the high frequency components of the signal train developed by said panchromatic scanning means.

12. In a color television system a first television camera channel representing virtually all the color aspects of a given scene to produce a substantially panchromatic type television signal, a plurality of other television camera channels each representing substantially none but one primary color aspect of the given scene to produce a color signal, a mixing circuit connected with all of said television channels for combining all of said color signals in opposite polarity relation with said panchromatic signal to produce a resultant output signal having components representing color aspects of the given scene different from those represented by any of said other television camera channels, a signal sampling circuit having a plurality of input terminals which are successively, individually and periodically channeled to a single output terminal at a predetermined sampling rate to produce an output signal comprising a series of grouped information elements, each element in a given group representing signal information appearing at a different input terminal, a separate low pass filter connected between a signal output of each of said other camera channels and a different respective input terminal of said sampling circuit, a connection from the output of said mixing circuit and another separate input terminal of said sampling circuit, a high pass filter having its input connected with the output of said first television camera channel to pass only high frequency panchromatic signal components, and means for mixing the output of said high pass filter with the output of each of said low pass filters before their said connection to said sampling circuit.

13. Apparatus according to claim 12 wherein said color television system is based on three primary colors, red, green and blue and wherein the number of said plurality of other camera channels is two, each representing a different one of said primary colors.

14. In a color television system a first television camera channel representing virtually all the color aspects of a given scene to produce a substantially panchromatic type television signal, a plurality of other television camera channels each representing substantially none but one primary color aspect of the given scene to produce a color signal, a mixing circuit connected with all of said television channels for combining all of said color signals in opposite polarity relation with said panchromatic signal to produce a resultant output signal having components representing color aspects of the given scene different from those represented by any of said other television camera channels, a signal sampling circuit having a plurality of input terminals which are successively, individually and periodically channeled to a single output terminal at a predetermined sampling rate to produce an output signal comprising a series of grouped information elements, each element in a given group representing signal information appearing at a different input terminal, a separate low pass filter connected between a signal output of each of said other camera channels and a different respective input terminal of said sampling circuit, a connection from the output of said mixing circuit and another separate input terminal of said sampling circuit, a high pass filter having its input connected with the output of said first television camera channel to pass only high frequency panchromatic signal components, and means for mixing the output of said high pass filter with the output of said signal sampling circuit.

15. In an electrical system for scanning a color scene to produce separate trains of electrical signals each representing a different complementary color aspect of the scene scanned, a first scanning means responsive to light of a plurality of colors to develop a first video signal train, a second scanning means at least responsive to light of a color to which said first scanning means is responsive, said second scanning means developing a second video signal train, a signal subtracting means having a plurality of input circuits and at least one output circuit and means for applying said first and second video signal trains to respective subtracting means input circuits whereby a third video signal representing different color value information is produced at the output circuit of said subtractive means.

16. Apparatus according to claim 15 wherein there is additionally provided two low pass electrical filters and one high pass electrical filter, and connections placing respective low pass filter series between the outputs of said scanning means and said subtracting means input circuits and wherein additional means are provided for connecting the input of said high pass filter with the output of at least one of said scanning means and means for mixing the output of said high pass filter with the output of said subtracting means.

17. An electrical scanning system for representing, in color, the explored areas of a scene by a plurality of concomitantly generated signal trains each representing a different one of a plurality of related color records of the scene, said system comprising in combination, a first scanning means for scanning said scene to develop a first video signal train representing intensity variations of a plurality of the related colors embraced by said color records, a plurality of other scanning means for scanning said scene, each of said other scanning means developing a discrete auxiliary video signal train representing color intensity variations of a type not represented by any other single scanning means, means for algebraically combining said first video signal train with at least one of said auxiliary signal trains to produce a difference signal train representing color intensity variations not alone represented by any single scanning means.

18. Apparatus according to claim 17 wherein there is additionally provided means for further combining signal trains other than said first signal train to produce other signal trains representing single color intensity variations not otherwise produced or alone represented by any single scanning means.

19. In a color television system a first television camera channel producing a first signal representing at least two color aspects of a given scene, a second television camera channel producing a second signal representing at least one color aspect of said given scene, a third television camera channel producing a third signal representing at least one color aspect of said given scene, a plurality of filter means for selecting the low frequency portions of certain of said signals, and combining means for combining said low frequency selected portions of said certain signals with any remaining non-selected color aspect signals to obtain at least three video signals which video signals represent at least the low frequency portions of a single different color aspect of said given scene, means for transmitting each of said last-named signals and means for selecting and transmitting the high-frequency components of said first signal along with said last-named low frequency video signals.

References Cited in the file of this patent

UNITED STATES PATENTS

| Number | Name | Date |
|---|---|---|
| 2,173,490 | Yanes | Sept. 19, 1939 |
| 2,493,200 | Land | Jan. 3, 1950 |
| 2,554,693 | Bedford | May 29, 1951 |

FOREIGN PATENTS

| Number | Country | Date |
|---|---|---|
| 524,443 | Great Britain | Aug. 7, 1940 |

OTHER REFERENCES

"A six-megacycle compatible high-definition color television system," RCA Review, vol. 10, Dec. 1949, pages 1–5.